United States Patent
Dodane

(10) Patent No.: US 8,210,486 B2
(45) Date of Patent: Jul. 3, 2012

(54) FIXING SYSTEM FOR HANGING BAR FOR KITCHEN UTENSILS

(75) Inventor: Paul Dodane, Charnay (FR)

(73) Assignee: Cristel SAS, Fesches-le-Chatel (FR)

( * ) Notice: Subject to any disclaimer, the term of this patent is extended or adjusted under 35 U.S.C. 154(b) by 488 days.

(21) Appl. No.: 12/096,785

(22) PCT Filed: Dec. 1, 2006

(86) PCT No.: PCT/FR2006/002634
§ 371 (c)(1),
(2), (4) Date: Jun. 9, 2008

(87) PCT Pub. No.: WO2007/083005
PCT Pub. Date: Jul. 26, 2007

(65) Prior Publication Data
US 2008/0290237 A1 Nov. 27, 2008

(30) Foreign Application Priority Data
Jan. 19, 2006 (FR) ...................................... 06 00496

(51) Int. Cl.
*A47B 96/06* (2006.01)
(52) U.S. Cl. .......... 248/214; 248/216.1; 24/525; 24/569
(58) Field of Classification Search ............. 248/220.22, 248/222.13, 223.41, 225.11, 214, 216.1, 248/221.11, 340, 227.4, 215; 24/525, 569; 411/522, 532
See application file for complete search history.

(56) References Cited

U.S. PATENT DOCUMENTS

| 2,413,772 | A | * | 1/1947 | Morehouse ..................... 24/457 |
| 2,558,720 | A | * | 7/1951 | Hansman ...................... 411/175 |
| 2,629,557 | A | * | 2/1953 | Rosenberg of Michael .. 238/310 |
| 2,888,971 | A | * | 6/1959 | Wootton ....................... 411/112 |
| 3,984,191 | A | * | 10/1976 | Doty ............................. 403/69 |
| 4,230,382 | A | * | 10/1980 | Wenzlick et al. ........... 312/265.1 |
| 5,941,485 | A | * | 8/1999 | Davidson et al. .......... 248/218.4 |
| 7,004,436 | B2 | * | 2/2006 | Knapp ..................... 248/220.22 |

\* cited by examiner

*Primary Examiner* — Kimberly Wood
(74) *Attorney, Agent, or Firm* — Egbert Law Offices PLLC

(57) ABSTRACT

The invention relates to a mounting device for a bar from which to hang kitchen utensils, such as ladles, skimming ladles, film dispensers, etc. The mounting device includes a mounting bracket and a clip. The mounting bracket is formed of a flat plate extended at one of its edges by a 90° bend. The plate has, on the opposite face to the bend, an engaging device and a central hole. The clip has a U-shaped cross section with a front face connected by a bridge of material to a rear face that has a cutout opening into the bottom of the rear face. The cutout engaging device can engage and slide. The invention makes it possible, using a complementary accessory, either spacer piece or leg, to mount the bar on a flat vertical support or under a horizontal support, and to choose the locations of the mountings.

7 Claims, 1 Drawing Sheet

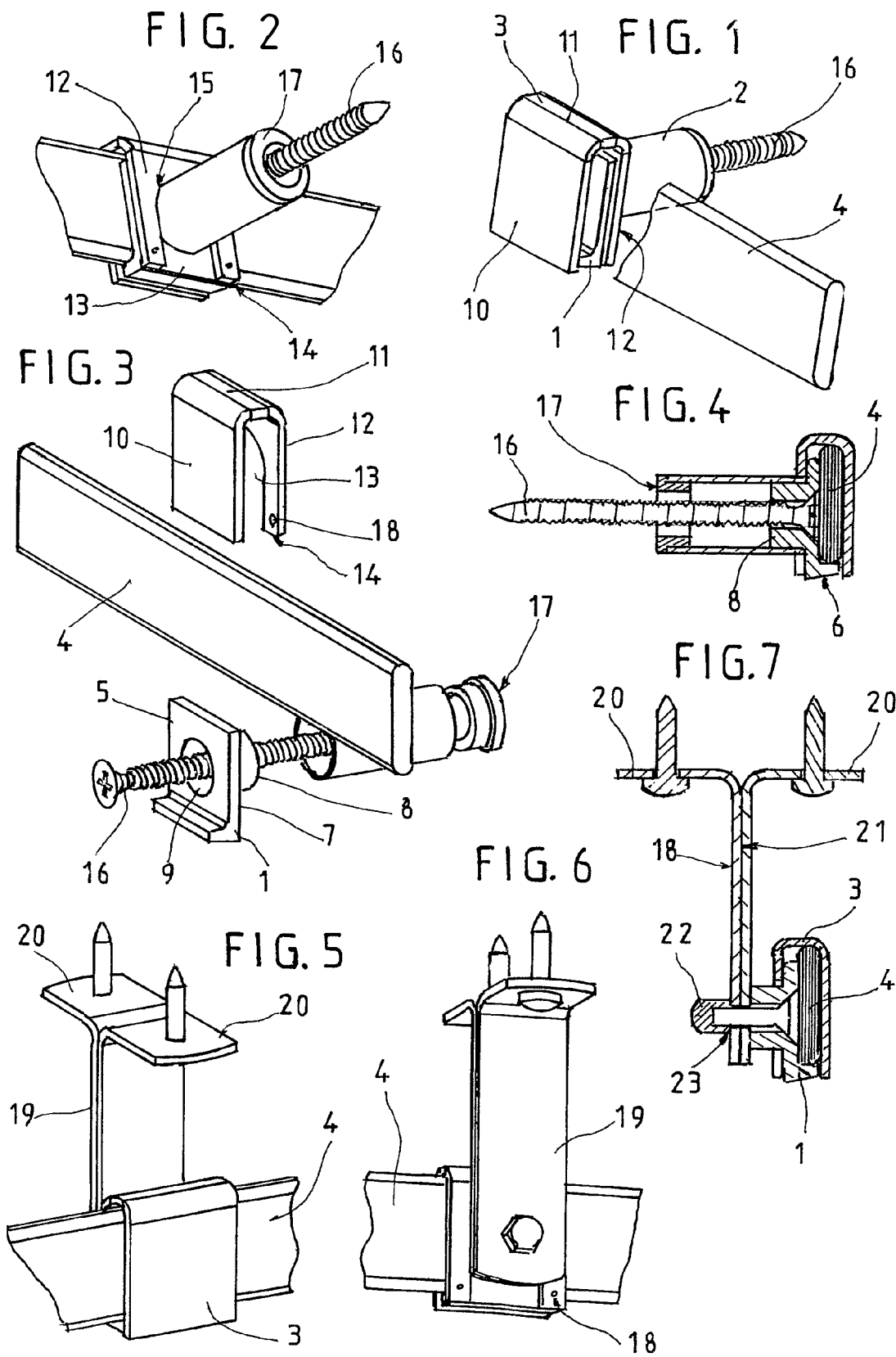

FIXING SYSTEM FOR HANGING BAR FOR KITCHEN UTENSILS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention relates to a new mounting device for a bar for suspending kitchen utensils. The mounting device for a bar for suspending kitchen utensils is essentially formed of a mounting bracket and a locking clip.

2. Description of Related Art Including Information Disclosed Under 37 CFR 1.97 and 37 CFR 1.98.

In the field of kitchen cabinet and work surface fittings, racks which place all utensils within reach are known. Skimming ladles, ladles, salt-cellars, film dispensers, etc., are suspended from a bar which has holes for mounting it on the wall. A rack of this type is described in document DE 37 10 485.

In most kitchens, the walls are covered with porcelain tiles and it is often necessary to drill in the middle of a tile, which is a tricky operation that carries the risk of breaking the tiles. This problem stems from the fact that the holes provided in the bars dictate the locations of the holes to be made in the wall.

Another document, FR 529 215, describes a bar system that has no mounting holes and is easily removable, because the bar is engaged at its ends in slots in two mounting brackets. This bar has no holes, but preformed lateral end stops which also dictate the locations of the holes to be made in a wall or some other vertical support.

BRIEF SUMMARY OF THE INVENTION

The invention aims to propose a mounting device that allows the locations of the holes to be chosen, for example such that they fall in the joints between the tiles, or at the point where two bars meet, and then allows the mounting means to be mounted therewith. A mounting bar is fitted that has no holes or lateral end stops, which may optionally be cut to length.

The invention also aims to propose a mounting device that can be used either for wall mounting or for mounting under a cabinet.

These objectives are achieved through the invention which consists of a mounting device for a bar from which to hang kitchen utensils, such as ladles, skimming ladles, film dispensers, etc. for example, characterized in that it mainly comprises a mounting bracket and a clip. The mounting bracket is in the form of a flat plate extended at one of its edges by a 90° bend, the plate having, on the opposite face to the bend, an engaging means and a central hole. The clip has a U-shaped cross section with a front face connected by a bridge of material to a rear face that has a cutout opening into the bottom of the said rear face, and in which cutout the engaging means can engage and slide.

BRIEF DESCRIPTION OF THE SEVERAL VIEWS OF THE DRAWINGS

The invention will be better understood with the aid of the following description given with reference to the following attached figures.

FIGS. 1 and 2 are overall perspective views of a mounting device according to a first alternative form of embodiment of the invention, depicted from the front and from the rear, respectively.

FIG. 3 is an exploded perspective view of the device of FIG. 1.

FIG. 4 is a cross sectional view of the device of FIG. 1, in the position of use.

FIGS. 5 and 6 are overall perspective views of a mounting device according to a second alternative form of embodiment of the invention, from the front and from the rear respectively.

FIG. 7 is a cross sectional view of the device of FIGS. 5 and 6.

DETAILED DESCRIPTION OF THE INVENTION

Reference is made first of all to FIGS. 1 to 4.

This first alternative form of embodiment of the invention is essentially made up of a mounting bracket (1), of a spacer piece (2) and of a clip (3) and is intended to be used for wall mounting.

The mounting bracket (1) is a part intended to support a flat bar (4) of rectangular cross section and is in the form of a flat rectangular plate (5) extended at one of its edges by a 90° bend (6). In the position of use, the rectangular plate is positioned vertically with the bend at the bottom and pointing towards the front of the plate, so that the flat bar (4) rests under gravity on the bend (6).

The spacer piece (2) is a simple cylindrical tubular element, having a length which determines the standoff between the bar and the wall or some other vertical support, such as the front face of a unit for example.

A means (7) of engagement between the plate (5) and the spacer piece (2) is provided, this for example being a cylindrical tubular projection (8) capable of engaging in the spacer piece and provided around a central circular hole (9) in the plate (5) and projecting towards the rear of the plate.

The clip (3) has a U-shaped cross section and comprises a solid substantially rectangular flat front face (10) connected by a bridge of material (11) to a rear face (12) that is also flat, and has an open cutout (13) opening onto the bottom edge (14) of the said rear face. The cutout (13) has a width at least equal to the external dimension or to the outside diameter of the engaging means (7) and/or of the spacer piece (2) and at its top (15) ends in a semicircle.

Furthermore, the interior distance between the two faces is at least equal to the thickness of the bar plus the thickness of the plate (5).

In the position of use of this first alternative form of mounting, the spacer piece is engaged over the rear projection of the mounting bracket which is mounted on a vertical plane using a horizontally positioned screw (16). As a preference, provision is made for the screw head to enter the hole (9) so that the bar can press against the plate (5).

Alternative forms of engagement between the spacer piece and the engaging means (7) may be envisaged, for example using a spacer piece engaged in the projection, or with a means (7) in the form of clip-fastening hooks or the like.

Furthermore, a decorative or hygienic washer or cap (17) engaged in the rear opening of the spacer piece and increasing the area for bearing against the wall may also be provided.

Once two mounting brackets have been mounted, a bar is fitted on these and then a clip is engaged over each bracket, with the opening of the cutout facing towards the rear of the mounting bracket and slipping it over the projection (8). Next, using a downward translational movement, each clip is fitted over the bar and the mounting bracket, pressing the bar against the plate of the mounting bracket.

Pins (18) are advantageously provided on the inside and near the bottom of one of the faces of the clip so that it holds itself in position by clip-fastening, the clip being removable by releasing the clips either by hand or using a tool.

Reference is now made to FIGS. 5 to 7. This second alternative form of embodiment is intended to be used for under-cabinet mounting.

In common with the first alternative form of embodiment, it comprises the mounting bracket (1) with its engaging means (7) and the clip (3) which collaborate with a mounting leg (19).

There are two alternative forms of embodiment of the mounting leg (19). The one depicted in the figures is for mounting under a suspended kitchen unit, using two screws each one engaged in one of the two 90° flanges (20) provided one on each side of the central web (21) of the leg (19).

Once two of these legs (19) have been mounted under a unit, a mounting bracket (1) is bolted directly to each bottom end of the legs (19), using a screw-nut system (22) engaged in a hole (23) in the leg (19).

For each of the alternative forms of embodiment, there are dimensional specifics of the clip and of the mounting bracket that need to be observed, particularly in the views in cross section of FIGS. 4 and 7.

The bridge of material (11) bears against the bar (4) and not against the mounting bracket, so that it presses this bar vertically onto the bend (6) of the mounting bracket.

The front and rear faces preferably, but not necessarily, completely cover the bar and the mounting bracket, particularly to give a good aesthetic appearance and to provide protection (against oil vapor, dust, etc.).

The front face of the clip presses against the bar (4) and not against the bend (6), so as to press this bar against the plate (5) of the mounting bracket.

The bar is immobilized by the clip and cannot slide sideways.

The advantages of the invention are non-restricted to the following characteristics.

Practical means of mounting the right-angled appearance is highly contemporary, although of course other external shapes of bridge of material could be envisaged.

The bars are supplied without holes, which means that the most appropriate mounting locations can be chosen, for example in a joint between two tiles or where two bars meet in order to hide the joint, therefore giving the impression of a single bar with no discontinuity even in changes of direction.

The bars can easily be cut to length as required.

The device has an ease of removal for maintenance, for example.

The engaging means (7) has two functions. It engages with the spacer piece in the first alternative form of embodiment of the invention. Tin the second alternative form of embodiment, it creates a standoff between the mounting bracket and the mounting leg to allow the clip to be fitted. This means (7) may optionally have forms other than the one shown in the figures.

The principle of the invention is not restricted to the mounting of flat bars. By adapting the dimensions of the mounting bracket and of the clip, it is possible to envisage securing the bars of circular, elliptical or some other cross section.

I claim:

1. A mounting apparatus comprising:
   a bar;
   a mounting bracket having a flat plate with a 90° bend formed along an edge of said flat plate, said 90° bend extending in a direction transverse from one face of said flat plate so as to support an edge of said bar thereon, said flat plate having a means for engaging extending from an opposite face of said flat plate, said mounting bracket having a central hole extending through said flat plate and said means for engaging; and
   a clip having a U-shaped cross section, said clip having a front face connected by a bridge of material to a rear face, said rear face having a cutout opening to a bottom of said rear face, said cutout slidably receiving said engaging means, said front face of said clip suitable for resting against a surface of said bar.

2. The mounting apparatus of claim 1, said means for engaging being a tubular projection, said central hole extending through said tubular projection.

3. The mounting apparatus of claim 1, further comprising;
   a tubular space piece engageable with said means for engaging.

4. The mounting apparatus of claim 1, said cutout having a width at least equal to an outer diameter of said means for engaging, said cutout having a semicircular edge at an upper portion thereof.

5. The mounting apparatus of claim 1, said distance between said front face and said rear face being at least equal to a thickness of said bar plus a thickness of said flat plate.

6. The mounting apparatus of claim 1, said clip having a plurality of clip-fastening pins on at least one of said front face and said rear face adjacent a bottom thereof.

7. The apparatus of claim 1, said bridge of material of said clip suitable for resting against said bar.

* * * * *